United States Patent [19]

Takada

[11] Patent Number: 4,645,231
[45] Date of Patent: Feb. 24, 1987

[54] STALK FOR A SEAT BELT BUCKLE OR THE LIKE

[76] Inventor: Juichiro Takada, 12-1, 3-Chome, Shinmachi, Setagayaku, Tokyo, Japan

[21] Appl. No.: 797,138

[22] Filed: Nov. 12, 1985

[30] Foreign Application Priority Data

Nov. 12, 1984 [JP] Japan .................... 59-170443[U]

[51] Int. Cl.⁴ ............................................. B60R 21/10
[52] U.S. Cl. ................................... 280/801; 297/482
[58] Field of Search ............... 280/801, 802, 807, 806; 297/482

[56] References Cited

U.S. PATENT DOCUMENTS

| | | | |
|---|---|---|---|
| 3,134,626 | 5/1964 | Ardenne et al. | 297/482 |
| 4,103,933 | 8/1978 | Fisher et al. | 280/801 |
| 4,119,344 | 10/1978 | Kondo | 297/482 |

Primary Examiner—David M. Mitchell
Assistant Examiner—Ross Weaver
Attorney, Agent, or Firm—Brumbaugh, Graves, Donohue & Raymond

[57] ABSTRACT

A stalk for supporting a safety belt buckle or the like in a generally predetermined position spaced-apart from an anchor member comprises a single piece of belt webbing material folded lengthwise along two folds to superpose both edge portions on the center portion and position the selvage edges closely adjacent each other. The edge portions are stitched to the center portion, thereby providing a double thickness of belt webbing of substantially half the width of the webbing material. A portion of one end of the folded and stitched webbing piece is folded back on itself and overlaps a portion of the other end, and said end portions are joined together to form the webbing piece into a loop. The loop passes through a hole in the anchor member, and the portions of the loop on opposite sides of the anchor member lie substantially flat closely adjacent each other and are stiffened and stabilized by a layer of polymeric material injected and molded in situ between said portions of the loop.

5 Claims, 3 Drawing Figures

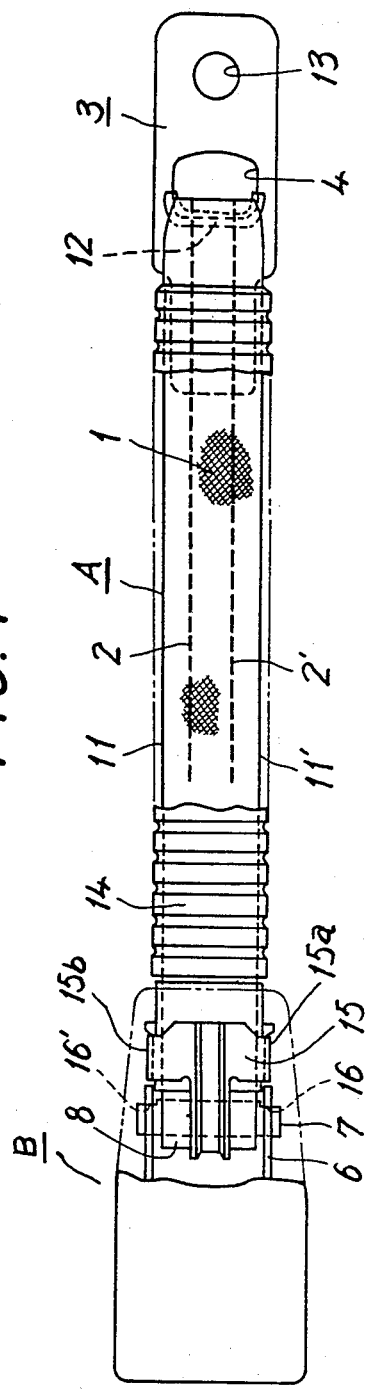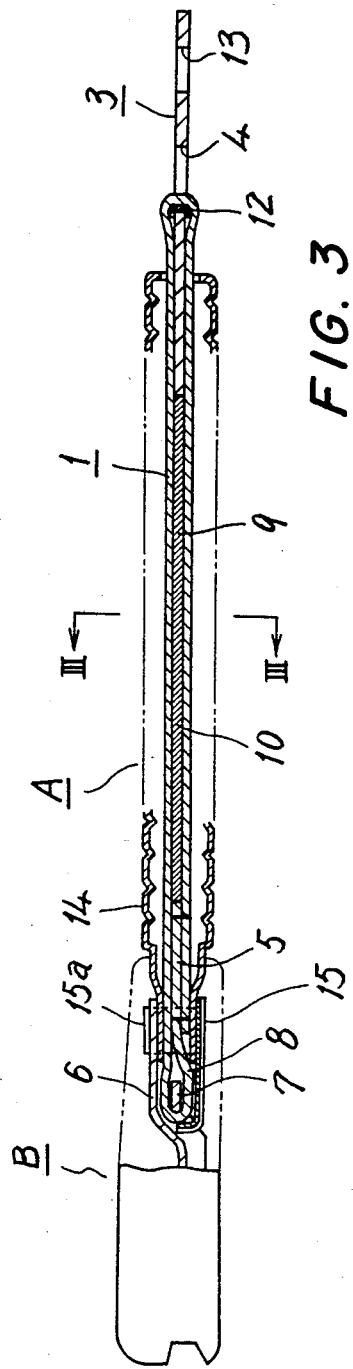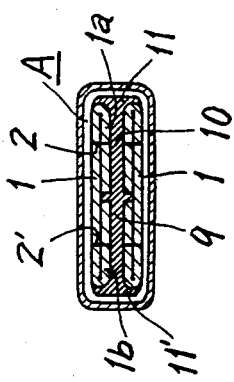
FIG. 1
FIG. 2
FIG. 3

STALK FOR A SEAT BELT BUCKLE OR THE LIKE

FIELD OF THE INVENTION

The present invention relates to a stalk for supporting a buckle of a vehicle seat belt in spaced relation from an anchor point in the vehicle, such as the floor next to the seat.

BACKGROUND OF THE INVENTION

A buckle stalk for a seat belt is generally fixed at its lower end to the floor of the vehicle, maintains the buckle at a predetermined height from the floor, that is, at a position that does not hinder a passenger from getting in and out of the vehicle, and enables the passenger to easily attach and release the seat belt with one hand. A buckle stalk of this kind must not only keep the buckle at a predetermined height but must also have a tensile strength capable of withstanding any impact load applied thereto from the seat belt and have a certain level of flexibility to enable proper fitting of the seat belt to the user and so that the seat belt adapts to the user's movements.

To satisfy the conditions described above, it is known to use for a buckle stalk wire rope or cable as a core and a flexible wire wound helically around the cable core member and to attach the buckle to the upper end of the cable core. However, such a stalk is both expensive and heavy, thereby increasing the cost of production, and it is also difficult to attach the core member to the buckle.

To solve these problems of conventional buckle stalks, buckle stalks have been proposed (e.g., Japanese Utility Model Publication No. 21412/1982) in which pieces of seat belt webbing are placed on both surfaces of a webbing-like reinforcing core member that is self-supporting but flexible. The pieces of webbing extend in the longitudinal direction of the core member coextensively and are folded back at each end. The folded back end portions are superposed and sewed together, and the outer surfaces of the webbing are covered with a cover or sheath. An anchor member and a buckle member are fitted to the respective ends of the stalk.

In the buckle stalks that use belt webbing described above, however, the webbing itself is not self-supporting; consequently, the stalk is made self-supporting by the reinforcing core member and the cover member, so that the number of components constituting the stalk portion and the number of assembly steps increases; hence, production costs increase. Thus, conventional stalks have left problems yet to be solved.

In order to reduce the number of necessary components and the number of assembly steps of the buckle stalk using conventional webbing, the inventor of the present device proposed previously a buckle stalk in which superposed pieces of webbing are sewed together so as to make the webbing itself self-supporting, thus to enable omission of the reinforcing core member. However, such buckle stalks are not entirely free from a problem of fraying at the ends of each sewed, superposed piece of the webbing. Also, the amount of stitching to make the stalk stiff enough to support the weight of the buckle is considerable. In addition, when the webbing is doubled back and sewed in order to reduce the width of the webbing, the number of webbing layers increases by a factor of four to six, so that sewing by machine is difficult. Therefore, there are several production problems yet to be solved.

SUMMARY OF THE INVENTION

In contrast to the stalks using belt webbing described above, the present invention pays specific attention to the problem of the costs of production resulting from the extra reinforcing components and extensive stitching to make the stalk self-supporting. The present invention forms the webbing constituting the stalk portion in a loop that is half the width of the webbing material, molds the loop into a stable element with a plastic material, and eliminates the reinforcing core member of the prior art devices, thereby reducing the number of components of the stalk and the number of assembly steps required to make it and eliminating the problems of the prior art devices described above.

More particularly, there is provided, according to the present invention, a stalk for supporting a safety belt buckle or the like in a generally predetermined but movable position spaced-apart from an anchor member affixed to the vehicle, the stalk being made from safety belt webbing material, being joined to the anchor member and being adapted to be joined to a buckle or the like. The invention is characterized in that a single piece of belt webbing is folded lengthwise along two fold lines to superpose both edge portions on the center portion and position the selvage edges closely adjacent each other, thereby providing a double thickness of belt webbing of substantially half the width of the webbing material, in that a portion of one end of the folded and stitched piece of webbing is folded back on itself and a portion of the other end overlaps the folded back end, said end portions being stitched together so as to form the webbing piece into a loop, in that the loop passes through an opening in the anchor member, and in that the portions of the loop on opposite sides of the anchor member opening lie substantially flat closely adjacent each other and are stiffened and stabilized by a layer of polymeric (plastic) material injected and molded in situ between said portions of the loop.

In a preferred embodiment, the invention is further characterized in that the portions of the loop on either side of the anchor member have the edge portions of the webbing material facing each other, and in that the polymeric materials fill any gaps between the selvage edges of the respective portions. Furthermore, it is preferred that there be no layer of plastic material in the end portion of the loop remote from the anchor member, whereby an opening is left in said end portion for a connector bar for the buckle or the like. It is also preferable that the overlapping stitched end portions of the loop be located proximate to one of the ends of the loop.

Hereinafter, a preferred embodiment of the present invention is described with reference to the accompanying drawings.

DESCRIPTION OF THE DRAWINGS

FIG. 1 is a front elevational view of the embodiment, portions of a cover and of a cover for the buckle being broken away;

FIG. 2 is a side cross-sectional view of the embodiment; and

FIG. 3 is an enlarged end cross-sectional view of the embodiment taken along line III—III of FIG. 2.

DESCRIPTION OF THE EMBODIMENT

In the drawings, reference numeral 1 represents a piece of seat belt webbing, which constitutes the principal element of the stalk A. The webbing piece 1 is made of the same material as the webbing that is generally used for the shoulder and lap belts of a vehicle safety belt system; i.e., it is a piece of safety belt webbing cut to the required length.

The seat belt webbing piece 1 is folded inwards lengthwise along two fold lines 11, 11' in such a fashion that its selvages 1a and 1b come together, as shown in FIG. 3. The folded and superposed portions are sewed along stitch lines 2, 2' in a longitudinal direction, thereby providing a length of belt webbing material half the width of and twice the thickness of the original piece.

The half-width belt webbing piece thus produced is then inserted through a hole 4 in an anchor member 3, and the portions on either side of the anchor member are folded or doubled face to face with the selvage portions facing each other. One end of one of such portions is folded back on itself with the selvage portions meeting to form a loop 8 portion (see the left end of FIG. 2) located at the desired location for connection to the buckle B, and the end of the other portion is placed over the loop portion 8 and fusion-bonded or sewed to the loop portion 8, thus to form the half-width piece 1 into an endless loop with the anchor member 3 coupled to it. The loop portion 8 is adapted to receive an anchoring pin or bar 7 fixed to a frame 6 of the buckle at a later stage in the assembly of the buckle B, stalk A and anchor 3.

The endless webbing loop, as described thus far, is placed into a mold, and a polymeric (plastic) material 9, such as a polyurethane resin, a vinyl chloride resin, a polyethylene resin or the like, is injected into the mold in order to fill the space 10 between the opposed surfaces of the looped belt webbing and any gaps between the selvages of the belt webbing loop. There is thus obtained a stalk A having at one end an anchor member 3 and at the other end a loop portion 8 for connecting the stalk to a buckle B. The stalk is self-supporting and capable of supporting the buckle B at a desired location but flexible enough to permit the buckle to move for proper fit of the seat belt system in which is it used.

The anchor member 3 includes a protective edge piece 12 around part (or all) of the inner periphery of the hole 4 so as to avoid any stress concentration in the portion of the stalk received through the hole. A hole 13 for an anchor bolt enables the anchor member 3 to be bolted to the car body.

Reference numeral 14 represents a flexible cover member, which is inserted over the webbing stalk A. The cover member 14 and the webbing stalk A are clamped by a T-shaped metal clamp 15 to the buckle frame 6, as described below.

The webbing stalk of the present invention, as preferably embodied in the construction described above, is used as follows. First of all, when the webbing stalk A and the buckle B are to be connected to each other, the loop portion 8 of the webbing stalk A is inserted between the opposed walls of the U-shaped frame 6 of the buckle B, and an anchoring pin 7 is inserted through holes 16, 16' formed on the opposed walls of the frame 6 and through the loop portion 8. The webbing stalk is then pulled in the direction of a load, and the cover member 14 is pulled over the webbing stalk A. The T-shaped metal clamp 15 is positioned at the end portion of the cover member 14 on the underside of the buckle B, and the legs 15a, 15b of the clamp 15 are bent over the base portion of the frame 6. In this manner, the webbing stalk A and the cover member 14 are connected to the frame 6 of the engagement member B by the clamp and the engagement pin 7.

In the embodiment, the superposed and fusion-welded (or sewed) portion 5 of the webbing stalk A is positioned close to the buckle B and is fixed to the frame 6 by the metal clamp 15. Therefore, the rigidity of this portion is improved, and a sharp bend at the connection between the buckle B and the stalk A, which could cause structural failure at the neck region, is prevented.

After the buckle stalk has been assembled in the manner described above, it is fixed to the car body by the anchor member 3 using an anchor bolt (not shown). Since the webbing stalk A is self-supporting, it supports the buckle B at a predetermined height, thereby facilitating removing or attaching a tongue which is connected to the seat belt. When the seat belt is connected to the webbing stalk A, the stalk is deflected towards the side of the car seat and improves the comfort and fit of the seat belt to the body of a passenger.

In the embodiment described above, the superposed and sewed loop portion 5 of the seat belt webbing 1 is positioned close to the buckle B in order to prevent structural failure at the neck region of the buckle B. However, the superposed and sewed portion 5 may be disposed close to the anchor 3 in order to prevent structural failure at the neck of the connecting portion with the anchor 3. In order to improve the appearance of the stalk, it is effective to dispose the superposed, sewed portion 5 close to either the buckle B or close to the anchor 3.

In the embodiment described above, furthermore, the buckle is connected to the loop portion 8 at the end of the webbing stalk A, thus to constitute a buckle stalk. However, the stalk of the present device is not particularly limited to such an embodiment. For instance, other engagement members, such as a tongue plate, may be connected to the webbing stalk in place of the buckle. It is, of course, also possible to connect a buckle or other engagement member to the car body using the webbing stalk A alone without using the cover member 14.

A webbing stalk, according to the present invention, is constructed such that both edge portions of a single piece of seat belt webbing material having a predetermined length are folded in such a fashion that they are superposed over the center piece with the selvages in abutment with or close to each other; the folded and superposed portions are sewed in a longitudinal direction to form a half-width, double-thickness belt webbing; that belt webbing is inserted through a hole of the anchoring hardware; one of the ends of the belt webbing thus assembled to the anchor is folded on itself and sewed to the other end to form a looped belt webbing; the looped belt webbing is formed in a flat shape in such a manner as to leave a loop portion for the connection to an engagement member, such as a buckle, on the end of the webbing loop opposite the portion passed through the anchoring hardware; and a plastic material is injected and molded in the space between the opposed surfaces of the looped belt webbing and any gaps between the selvages thereof in order to provide the looped belt webbing with a self-supporting property capable of at least supporting the engagement member. Thereof, the present device eliminates the necessity of using the reinforcing core member of the conventional buckle stalk. The webbing stalk is, in particular, made self-supporting, according to the invention, by placing the seat belt webbing into the mold while it is held inserted into the anchoring hardware, and then injection-molding the plastic material in situ inside the mold. Therefore, the number of necessary components and the number of assembly steps when producing the buckle stalk can be reduced and production costs can be limited. Furthermore, the weight of the webbing stalk can also be reduced.

In accordance with the present invention, moreover, the self-supporting property of the webbing stalk can be adjusted as desired, irrespective of the impact resistance and load strength of the seat belt webbing, by adjusting the composition of the plastic material and the amount injected into the space between the opposed surfaces of the looped belt webbing and gaps between the selvages. Therefore, the desired self-supporting property and flexibility can be obtained in accordance with the weight of the engagement member and conditions of use. In consequence, the feel and fit when the seat belt is fitted can be improved, and a passenger can be safely but comfortably restrained by the seat belt.

I claim:

1. A stalk for supporting a safety belt buckle or the like in a generally predetermined position spaced-apart from an anchor point on a vehicle and assembled to an anchor member, the stalk being made of safety belt webbing material, characterized in that a single piece of belt webbing material is folded lengthwise along two fold lines to superpose both edge portions on the center portion and position the selvages closely adjacent each other and the edge portions are stitched to the center portion, thereby providing a double thickness of belt webbing of substantially half the width of the webbing material, in that a portion of one end of the folded and stitched piece is folded back on itself and overlaps a portion of the other end, in that said overlapping end portions are joined together to form the piece into a loop, in that the loop passes through a hole in the anchor member, and in that the portions of the loop on opposite sides of the anchor member lie substantially flat closely adjacent each other and are stiffened and stabilized by a layer of polymeric material injected and molded in situ between said portions of the loop.

2. A stalk according to claim 1 and further characterized in that said portions of the loop have the selvage edge portions of the webbing material facing each other, and in that the polymeric material fills any gaps between the selvage edges of the respective portions.

3. A stalk according to claim 1 and further characterized in that there is no polymeric material in the end portion of the loop remote from the anchor member, whereby an opening is left in said end portion for a connector bar for the buckle or the like.

4. A stalk according to claim 3 and further characterized in that the overlapping joined end portions of the loop are located proximate one of the ends of the loop.

5. A stalk according to claim 2 and further characterized in that there is no polymeric material in the end portion of the loop remote from the anchor member, whereby an opening is left in said end portion for a connector bar for the buckle or the like.

* * * * *